United States Patent [19]
Whiteman

[11] Patent Number: 5,362,036
[45] Date of Patent: Nov. 8, 1994

[54] MODULAR WELDING FIXTURE APPARATUS

[75] Inventor: Stephen S. Whiteman, Marlow, Okla.

[73] Assignee: Halliburton Company, Duncan, Okla.

[21] Appl. No.: 97,342

[22] Filed: Jul. 23, 1993

[51] Int. Cl.$^5$ ............................................. B23Q 3/02
[52] U.S. Cl. ..................................... 269/51; 269/900; 269/303
[58] Field of Search ...................... 269/900, 45, 47, 50, 269/51, 296, 43, 303; 228/49.3

[56] References Cited

U.S. PATENT DOCUMENTS

| | | | |
|---|---|---|---|
| 2,887,079 | 5/1959 | Wilson | 269/45 |
| 3,540,128 | 11/1970 | Giles | 269/47 |
| 3,565,416 | 2/1971 | Williamson et al. | 269/47 |
| 4,073,215 | 2/1978 | Coope et al. | 269/900 |
| 4,310,963 | 1/1982 | Blumle | 269/900 |

FOREIGN PATENT DOCUMENTS 764929  11/1977  U.S.S.R. .................. 269/900

*Primary Examiner*—Robert C. Watson
*Attorney, Agent, or Firm*—Stephen R. Christian

[57] ABSTRACT

A modular welding fixture apparatus for positioning a workpiece. The fixture includes a base table having an array of openings through the surface and an array of locator mounting holes co-located in a spaced relationship with respect to the openings to accommodate at least one vertical end locator having a base plate that is removably mountable to the base table at preselected positions thereon, and the locator has means for locating and holding at least a portion of a workpiece. The fixture further includes at least one horizontal locator having a base plate that is removably mountable to the base table at preselected positions thereon, and the base plate having means for locating and holding at least a portion of a workpiece.

An alternative embodiment includes a rotatable base plate and a rotatable front plate to allow greater flexibility in the positioning of workpieces at various angles with respect to the base table.

13 Claims, 6 Drawing Sheets

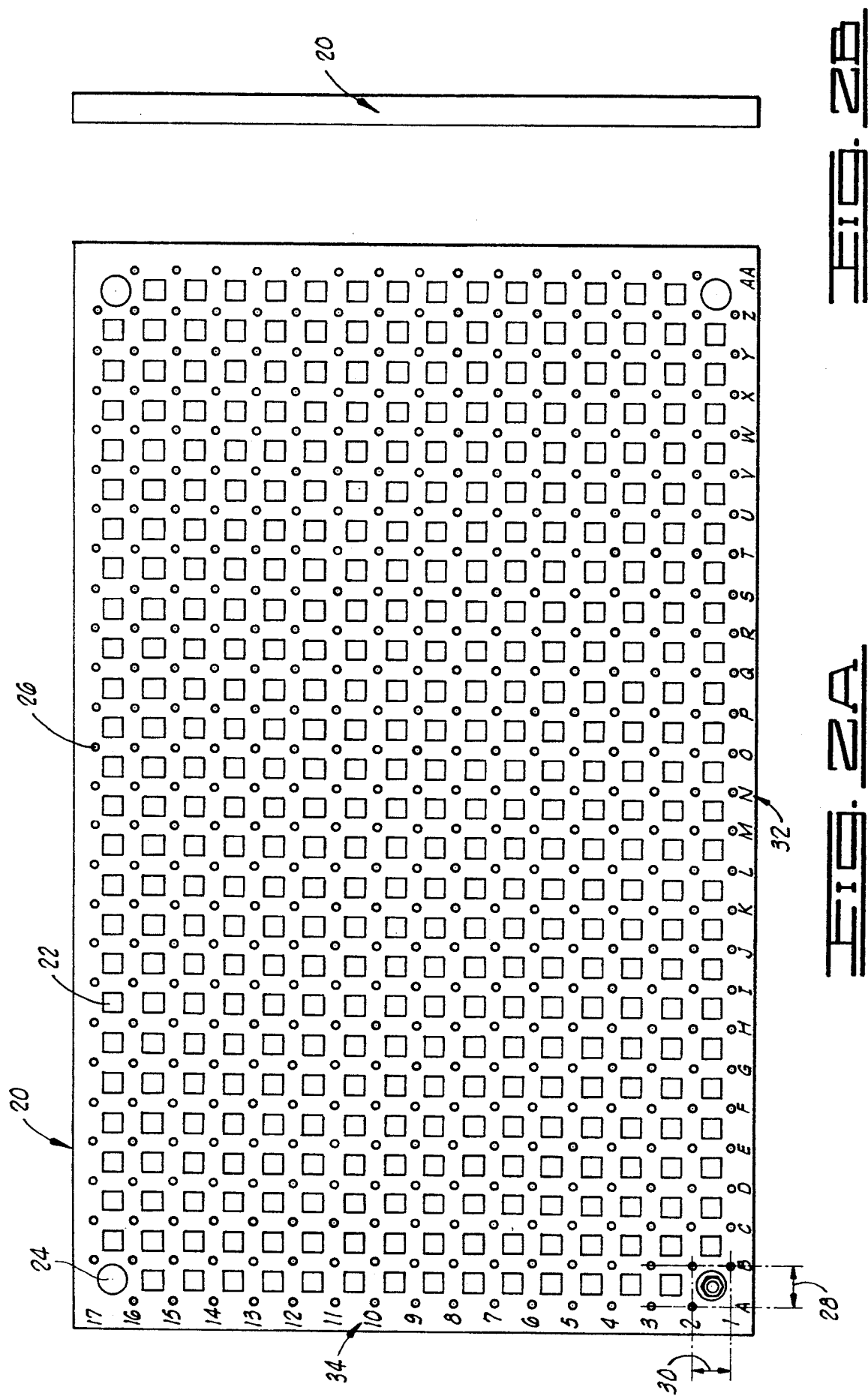

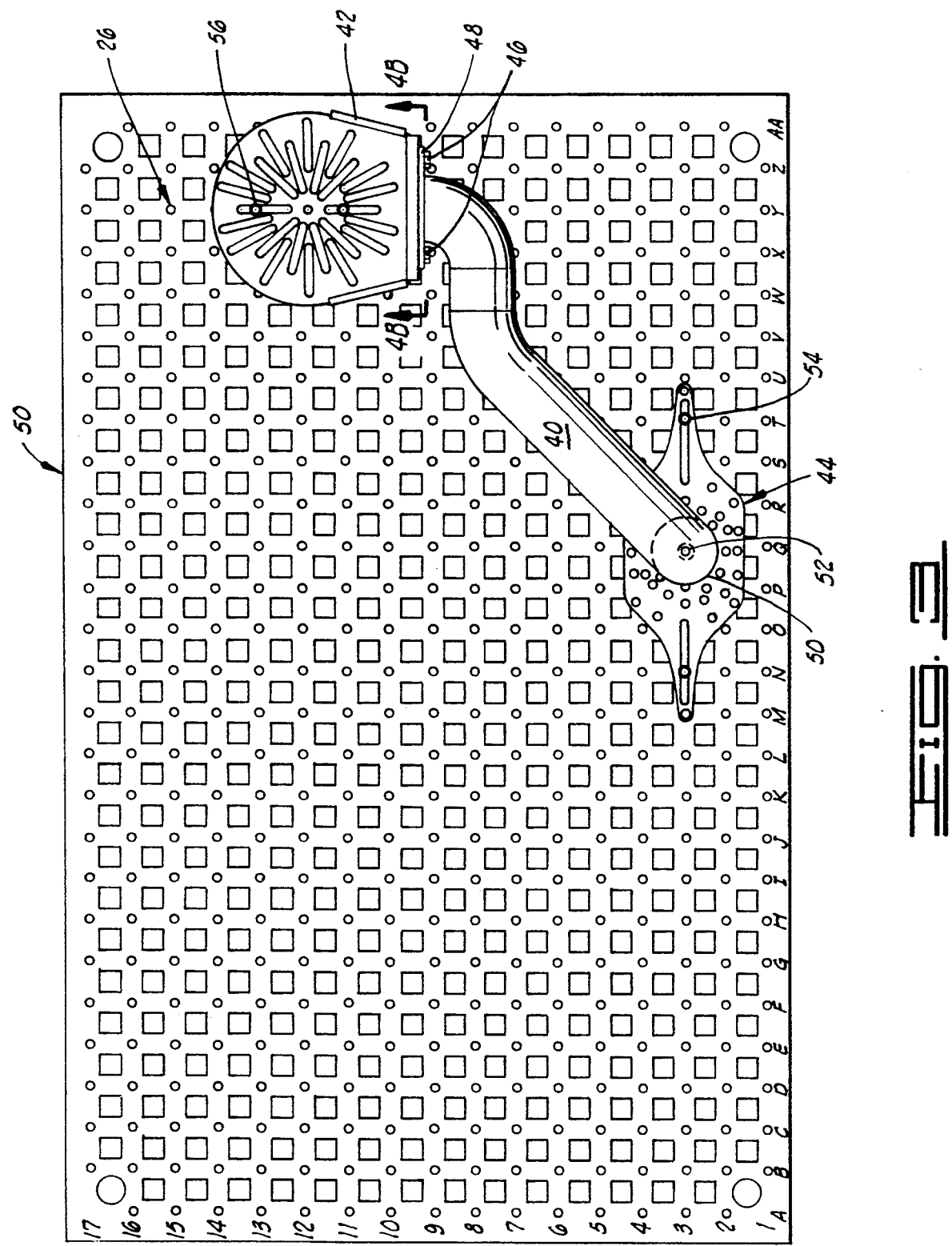

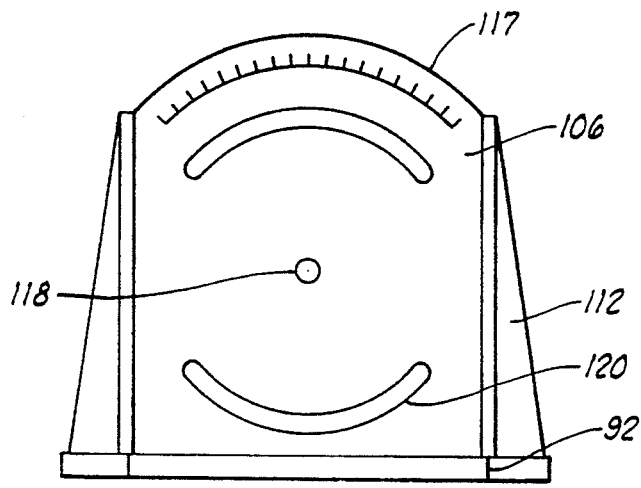
FIG. 6D
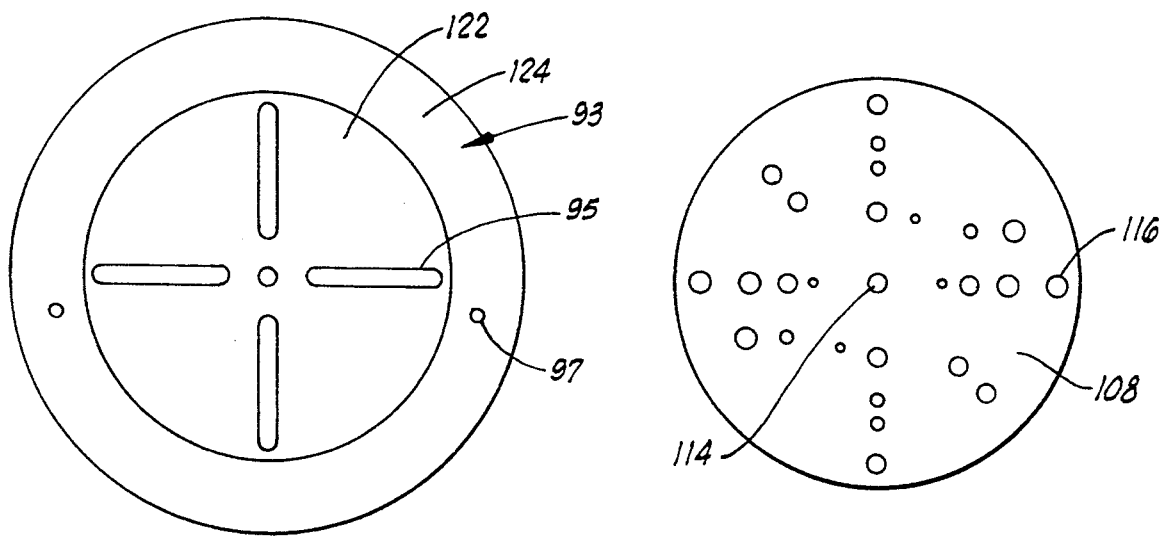
FIG. 6E
FIG. 6F

MODULAR WELDING FIXTURE APPARATUS

BACKGROUND OF THE INVENTION

This invention relates generally to welding, or positioning, fixtures suitable for fabricating weldable workpieces to close dimensional tolerances, and particularly relates to a welding/positioning fixture apparatus especially suitable for precise alignment and fabrication of weldable fluid piping manifolds.

Very close dimensional tolerances are required in the fabrication and welding of fluid piping manifolds having flanges that are bolted, or otherwise connected, to other manifolds having matching flanges and/or are attached directly to associated equipment such as high pressure liquid pumping systems used for example in the production of oil and gas. Maintaining close tolerances in the fabrication and welding of such manifolds enhances the interchangeability and serviceability of the manifolds in the field as well as reducing the manufacturing and assembly lead time for systems employing such manifolds. Prior art welding fixtures are typically used to position various sections of a workpiece in place before and during tack-welding thereof to form a unitary structure that can be fully welded either prior to removing the workpiece from the fixture, or after removing the workpiece from the fixture. The use of the terms welding and positioning with respect to fixtures are considered to be interchangeable herein. By using such fixtures, the dimensional tolerances of the workpiece are usually held within acceptable limits. Furthermore, the use of such fixtures reduce production costs because welding equipment operators spend considerably less time positioning and welding individual subcomponents of the workpieces together with the aid of a fixture as compared to welding the pieces together free handedly.

In the case of fabricating and welding fluid piping manifolds to strict dimensional requirements, such as those required for manifolds to be used in high pressure pumping systems typically used in the production of oil and gas reserves, a conventional fixture would be built to accommodate the particular manifold geometry set forth in the detailed manufacturing drawings of that particular manifold. A representative prior art fixture 4 having such a manifold 2 positioned therein is shown in FIGS. 1A and 1B of the drawings. As can be seen in FIGS. 1A and 1B, the particular manifold 2 shown consists of a hollow straight pipe section 10, an intersecting pipe 9, and an elbow 11. Horizontal flanges 12 are located at the free ends of pipe 9 and elbow 11. Flanges 12 are located on the base of the fixture by locating pins and/or bolts. Upright member 6 supports manifold end 13 by way of coupling 8. After so positioning the various components the welding operator may proceed to tack weld the components together and if desired, perform the final welding required to complete the manifold. Thus, if a manifold requires strict dimensional tolerances, the fixture to be used in the fabrication and welding of that manifold would have to be made to even more exacting tolerances to insure that each manifold fabricated within the fixture met the tolerances set forth in the manufacturing drawings. Although such conventional fixtures are effective, the fixtures are costly and time consuming to build and are also costly and time consuming to revise as design changes are made to the manifold in which a particular fixture is used, especially in the case of manifolds having complex configurations. In addition to the costs of building the fixtures, the use of the fixture is typically limited to one particular manifold geometry of a particular size making it necessary not only to build a fixture for each manifold geometry or size, but also making it necessary to store, retrieve, and set up a particular manifold-specific fixture when that particular manifold is produced on less than a full-time basis at a given fabricating/welding station.

Therefore, it is an object of the disclosed invention to reduce the costs associated with building, revising, storing, and retrieving welding fixtures designed to accommodate a specific workpiece having a specific geometry.

It is a further object of the disclosed invention to provide a welding fixture apparatus that can be easily adapted to accommodate a wide variety of workpieces having a wide variety of geometrical configurations and sizes.

It is a yet further object of the disclosed invention to provide a welding fixture apparatus that will maintain close tolerance dimensioning between fabricated workpieces.

These and other objects and benefits of the disclosed invention will be discussed and depicted in the specification and the drawings hereof.

SUMMARY OF THE INVENTION

A modular welding fixture apparatus for positioning a workpiece is disclosed. The modular welding fixture apparatus includes a base table having a base surface of a predetermined width and length having an array of openings through the surface of a predetermined size and configuration. The surface further has an array of locator mounting holes co-located in spaced relationship with respect to the openings. The holes extend essentially perpendicularly a predetermined distance into the work surface. The fixture is further provided with at least one vertical end locator having a base plate that is removably mountable to the base table at preselected positions and at preselected angles with respect to a preselected datum. The vertical end locator has a front plate adjoining and extending at essentially a right angle from the base plate and the front plate has provisions for locating and holding at least a portion of a workpiece. The fixture is yet further provided with at least one horizontal locator having a base plate that is removably mountable to the base table at preselected positions thereon. The base plate has provisions for locating and holding at least a portion of a workpiece.

An alternative embodiment of a the modular welding fixture apparatus for positioning a workpiece is also disclosed. The alternative apparatus also includes a base table having a base surface of a predetermined width and length having an array of openings through the surface of a predetermined size and configuration. The surface has an array of locator mounting holes co-located in a spaced relationship with respect to the openings. The holes extend essentially perpendicularly a predetermined distance into the work surface. The alternative fixture further includes an adjustable vertical locator having a base plate joined to a vertically oriented front plate at an approximate right angle to each other. The adjustable vertical end locator further has a first rotatable base rotatively mounted to the base plate which is removably mountable to the base table at preselected positions and at preselected angles with respect to a preselected datum. The adjustable vertical locator further has a second rotatable base rotatively mounted to the front plate and having provisions for locating and holding at least a portion of a workpiece. The alternative fixture also has at least one horizontal locator having a base plate that is removably mountable to the base table at preselected positions thereon, and the base plate has provisions for locating and holding at least a portion of a workpiece.

BRIEF DESCRIPTION OF THE DRAWINGS

FIG. 2A is a top view of the table base of the disclosed modular welding fixture.

FIG. 2B is a side view of the table base of the disclosed modular welding fixture.

FIG. 3 is a top view of an embodiment of the disclosed modular welding fixture shown with a representative piping manifold being positioned therein by a single vertical locator and a single horizontal locator.

FIGS. 6A-6C are top, front, and side views respectively, of an adjustable vertical locator assembly that can be used in lieu of the vertical locator shown in FIGS. 4A-4C, or when specific flange angles are called for.

FIG. 6D is a front view of the previously depicted adjustable locator having he rotatable bases removed therefrom.

FIGS. 6E and 6F are top views of rotatable base 93 and rotatable base 108 respectively.

DETAILED DESCRIPTION OF THE DRAWINGS

Figure 1A:
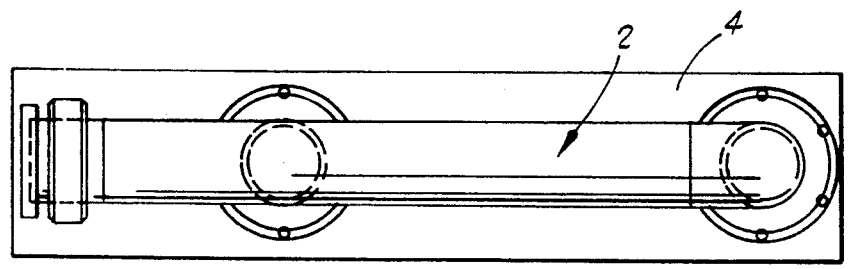
FIG. 1A is a top view of a representative fluid piping manifold positioned in a prior art welding fixture.
Figure 1B:
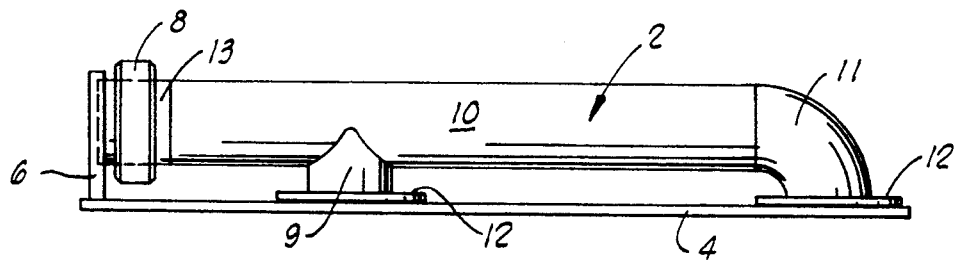
FIG. 1B is a front view of the representative fluid piping manifold and prior art manifold welding fixture shown in FIG. 1A.

The disclosed invention, as shown in the drawings, will be described with a description of the operation of the disclosed invention following.

Referring now to FIG. 2A of the drawings, a top view of a welding table base 20 is shown. As can be seen in FIG. 2B base table 20 is essentially a slab which can be cast of iron or formed of steel plate. Returning to FIG. 2A, base table 20 preferably consists of a matrix of rectangular holes 22 passing through the base. Somewhat larger circularly shaped holes 24, located at each of the four corners of the base serve to mount the base to a stand by bolts. The base shown in FIG. 2A has a hole matrix of 16 rows and 26 columns with holes 22 being located on 3.5 inch centers with respect to each other. Base table 20 is also provided with an array of holes 26 preferably arranged in such an order to provide a hole in proximity to each corner of each rectangular hole 22 and are horizontally spaced from each other a predetermined center-to-center distance 28 and a predetermined vertical center-to-center distance 30. The exact spacing may be preselected to suit the immediate needs, however, 3.5 inches for both distances 28 and 30 works well. Preferably the holes pass through the base and are threaded so that surface flush bolts, or screws, can be installed therein to prevent the holes from being filled with welding spatter. Lastly, it is suggested that each hole 26 be identified by incorporating an alphanumeric hole locator means, or grid, to facilitate fixture setup by the welding operator. For example, as depicted in FIG. 2A, each column of holes is identified alphabetically by characters 32 and each row of holes is identified numerically by numerals 34. Commercially available welding base tables are marketed in a variety of sizes which can readily be modified to include the above described features.

Turning to FIG. 3 of the drawings. FIG. 3 depicts previously described welding base table 20 having a representative fluid manifold 40 comprised of several segments being positioned thereon. As can be seen in FIG. 3, manifold 40 is held in place by a vertical end locator 42 and a horizontal end locator 44 which serve to locate and position respective end portions of representative manifold 40. In particular, vertical end locator 42, made of steel or other suitable material, locates and positions vertically oriented, with respect to base table 20, flange 48 by way of bolts 46 which are passed through preexisting holes in flange 48 and are removably threaded into vertical end locator 42. In a likewise fashion, horizontal end locator 44 accommodates horizontally oriented, with respect to table base 20, manifold end 50, which is located and retained in position by way of a coupling, not shown, which attaches to locating pin 52 which is in turn attached to horizontal end locator 44 at an appropriate position and in which pin 52 engages manifold end 50 at the center point. Threaded bolts 54 and bolts 56 serve to secure locators 44 and 42, respectively, to welding base table 20 by being removably threaded into preselected threaded holes 26.

Figure 4A:
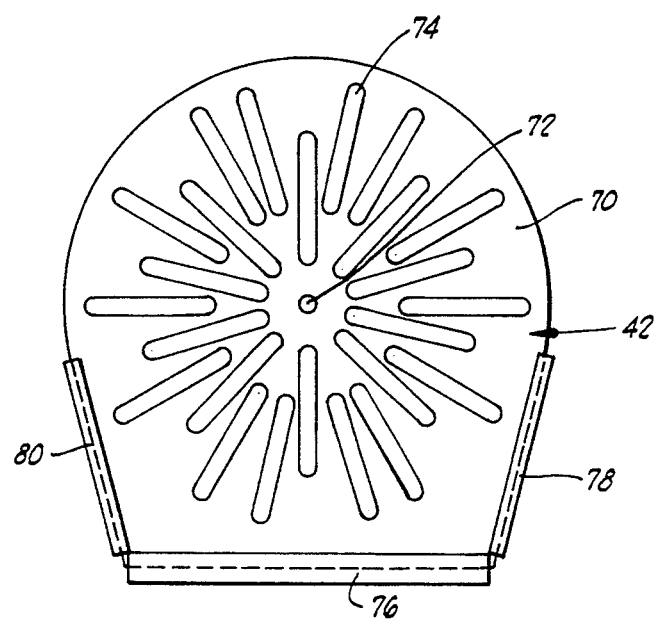
FIGS. 4A-4C are top, front, and side views respectively, of the vertical locator depicted in FIG. 3 of the drawings.
Figure 4B:
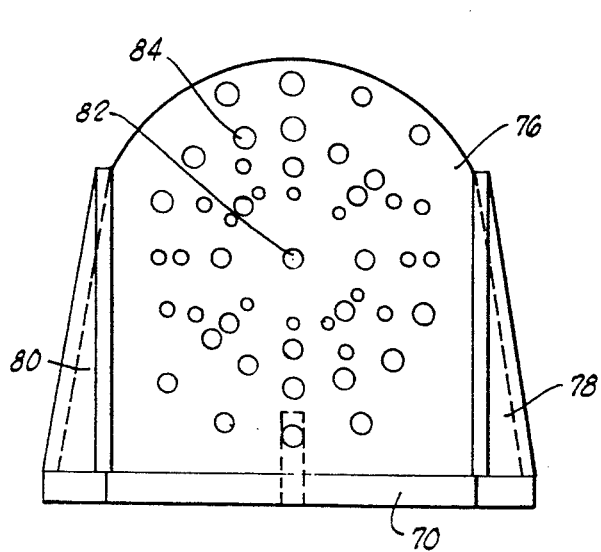
Figure 4C:
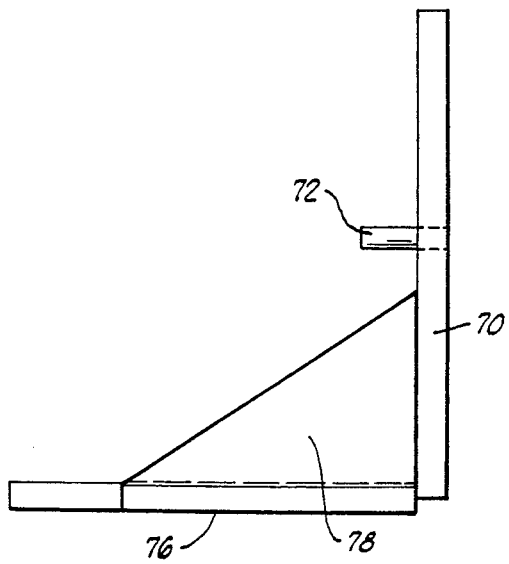

More detailed top, front, and side views of vertical end locator 42 are depicted in FIGS. 4A, 4B, and 4C respectively. In FIG. 4A, vertical end locator 42 includes a base plate 70 having a pin 72 centrally located and extending perpendicularly outward from base plate 70. Pin 72 enables a welding operator to precisely locate end locator 42 on welding base table 20 by measuring with calipers or other suitable device, a predetermined distance between pin 72 and another pin which has been inserted in one of the holes 26 of welding base table 20. Base plate 72 is further provided with a plurality of slots 74 extending radially away from the center portion of the base plate and terminating shy of the outer edge of base plate 70. The length and placement of these slots is such that the end locator 42 is able to be placed at a known angle increment on a row or column of holes 26 on welding base table 20 and be continuously adjusted along the line defined by that row or column.

Vertical end locator 42 is provided with a front plate 76 which may be integral or welded at a right angle to base plate 70. Left and right hand stiffener plates 78 and 80 provide enhanced strength and rigidity to front plate 76 when locator 42 is placed into service and when being transferred to storage. The outer profile of front plate 76 can best be viewed in FIG. 4B. Center hole 82 is located in the horizontal center of front plate 76 and at a set distance from the bottom of base plate 70 and serves to attach locating pins for manifold ends other than ends having flanges. Holes 84 in front plate 76 are located to accommodate the bolt patterns of flanges that are to be mounted against front plate 76. As can be seen in FIG. 4B, several such holes 84 can be positioned allowing the accommodation of a wide variety of flanges of various manifolds or other workpieces to be positioned thereby. Holes 84 are positioned to allow different standard orientations of flanges on front plate 76. It is preferred that holes 84 be threaded to accommodate bolts that have been passed through the flange to be held. In lieu of threading holes 84, nuts can be removably threaded onto slightly longer bolts that have been inserted through a manifold flange and unthreaded holes 84 and which are of sufficient length to extend beyond the back surface of plate 76. However, any suitable means of attachment could be used which allows a given flange to be positioned against or proximate to plate 76.

Figure 5:
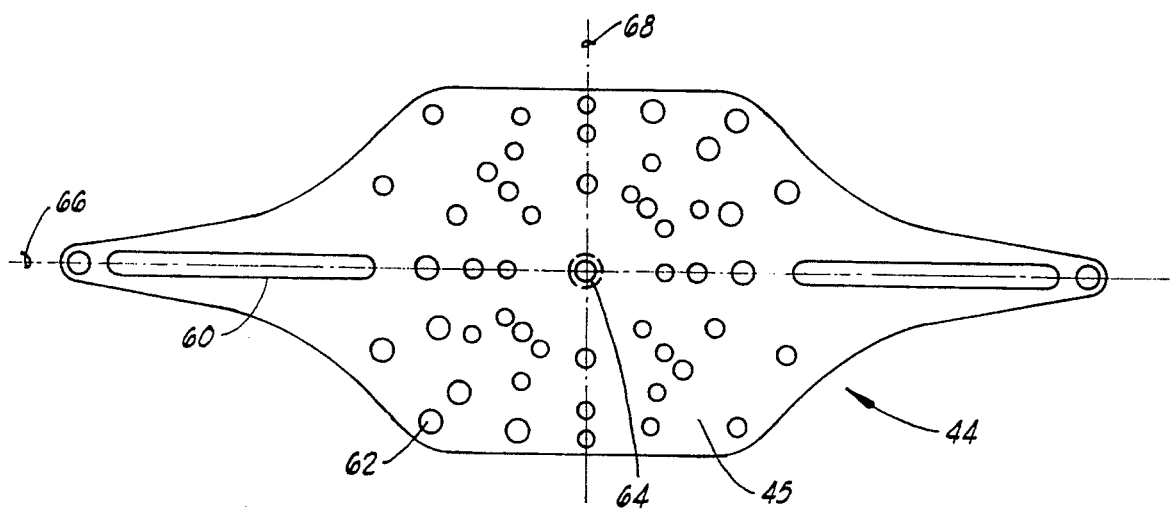
FIG. 5 is a top view of the horizontal locator shown in FIG. 3 of the drawings.

Referring now to FIG. 5, which is a top view of the horizontal end locator 44 shown in FIG. 3. Horizontal end locator 44 includes a base plate 45 made of steel, or other suitable material, which has a pair of opposing slots 60 separated by a central locator hole 64. Slots 60 are of sufficient width to allow bolts to be passed therethrough to be threaded into preselected holes 26 on welding base 20. The length and placement of these slots allows one horizontal end locator 44 to be continuously adjusted along a line defined by a column or row of holes 26. A plurality of manifold flange locating holes 62 are selectively positioned about base plate 45. These holes 62 are positioned to locate beach flange in preselected standard orientations. Preferably, holes 62 are threaded to conveniently accept bolts (not shown) that have been passed through holes in a given manifold flanges for securing the flange to locator 44. However, other suitable means of attaching flanges to locator 44 can be used in lieu of threaded holes accommodating bolts.

The embodiment of horizontal end locator 44 of FIG. 5 is shown to have a major axis 66 and a minor axis 68 with slots 60 being located on major axis 66 with the overall width of plate 45 narrowing with respect to distance from center hole 64. This configuration allows for ample surface area for receiving manifold flanges while also conserving the amount of material making up locator 44 and thus the weight of locator 44. Other configurations can be used however.

An adjustable vertical end locator assembly 90, made of steel or other suitable material, is shown in FIGS. 6A through 6J of the drawings. Adjustable end locator 90 can be used in lieu of vertical end locator 42 in order to position manifolds having vertical flanges that are angled in such a manner, or having flange bolt holes oriented in such a manner, that locator 42 would not readily accept the flange. For example, a flange may be positioned at a 32° angle with respect to a given datum point, in lieu of a more standard 45° or a 90° angle such as the flange being supported by vertical end locator 42 shown in FIG. 3 of the drawings. Such a modification to end locator 45 to accommodate such non-standard angles may not be possible because of geometry constraints or may not be justifiable for the quantity of such manifolds, or workpieces, to be produced.

Figure 6A:
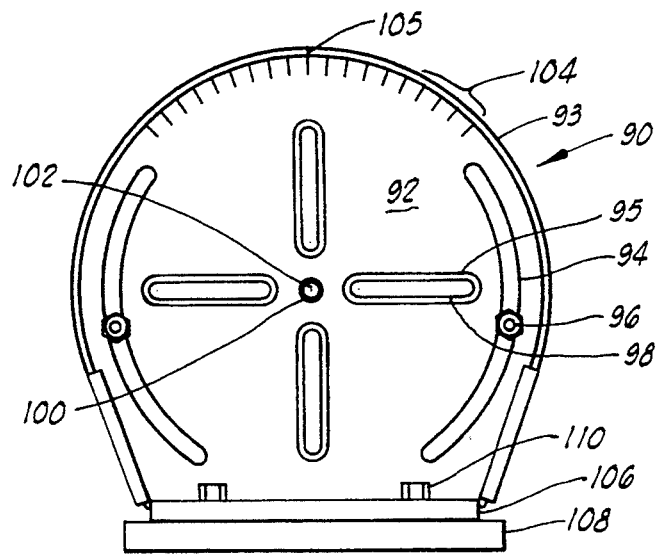
Figure 6B:
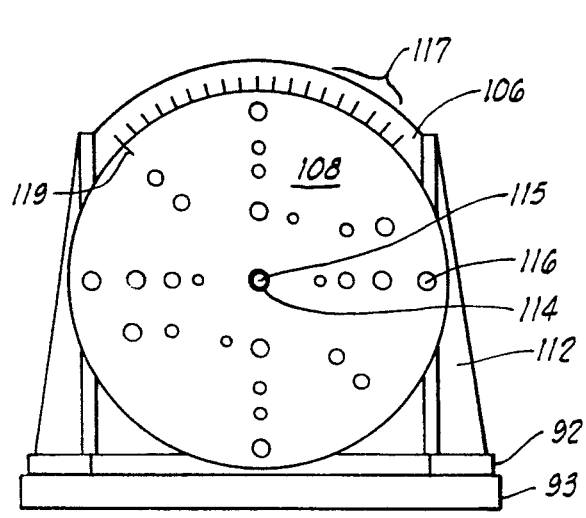
Figure 6C:
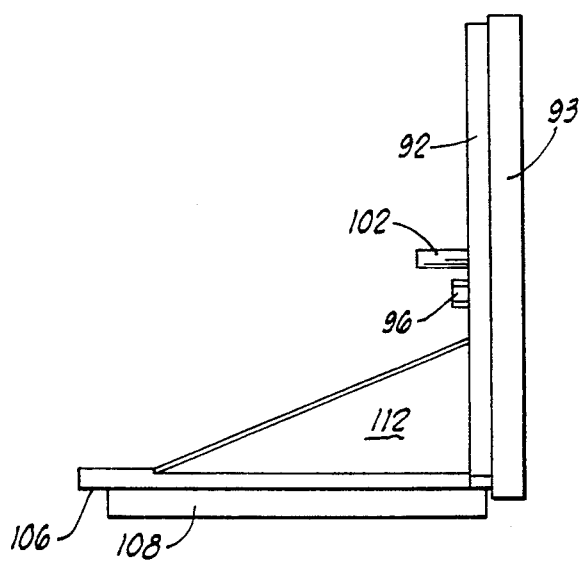

Referring now to FIGS. 6A–6C, adjustable locator 90 includes base 92 and a rotative circular base 93 located beneath base 92. Base 92 has opposing curved slots 94 located thereon to allow bolts 96 to be passed through the slots in order to be threaded into rotatable base 93. Base 92 is also provided with 4 radially extending straight slots 98 located 90° from each other with respect to the center of base 92. Slot 98 are shown positioned directly above similarly configured slots 95, which are located on circular base 93. Slots 98 are slightly larger than underlying slots 95 in order to allow bolts (not shown) to be passed through slots 98 and inserted through underlying recessed slots 95 whereupon the bolts can be threaded into holes on the base table to cinch circular base 93 there against. Slots 95 are configured to allow adjusting locator 90 to be continuously adjusted along the line defined by a column or row of holes 26 in welding base table 20. A centrally located pin 102 is press fitted into circular base 93 and complementary hole 100 with an optional bushing is provided in base 92 for receiving pin 102 which serves as a common locating and rotating point for adjusting the relative angular position of base plate 92 with respect to circular base plate 93. The relative positioning is conveniently achieved by way of scale 104. Scale 104 is inscribed on base plate 92 and an inscribed reference mark 105 is positioned on circular base 93. Scale 104 reads 0° in the center, and 45° on each end thereof to provide in total a 90° arc. Pin 102 also serves the same positioning function as pin 72 of the vertical end locator 42.

Adjustable vertical locator 90 is also provided with a vertically oriented base 106 which is positioned perpendicular to base plates 92 and 93. Base 106 accommodates a rotatable base 108 which in the embodiment shown, is particularly suitable for accommodating manifold flanges being positioned thereon. As can be seen in FIG. 6B, rotatable base 108 is provided with a centrally located hole 114 which has a pin 115 press-fitted therein. Base 108 is provided with a variety of prepositioned holes 116 sized for accommodating pins or which are threaded to accommodate bolts (neither shown) that match selected holes in a flange having a certain hole pattern therein. A scale 117 ranging from 0° to 90° for denoting the relative angle between rotatable base 108 and base 106 is inscribed near the outer periphery of base 106, and a scribe, or mark 119, is provided on base 108 to act as a pointer with respect to scale 117. Bolts 110 serve to cinch rotatable base 93 against base 92 after positioning the bases at the desired relative angle. Bolts 110 pass through respective oppositely positioned curved slots 120 provided in base 92. Slots 120 can be viewed in FIG. 6D which is a front view of locator 90 with rotatable base 108 removed as well as rotatable base 93 removed. Also viewable in FIG. 6D is hole 118 which preferably is sized and configured to accommodate a press-fit bushing for ultimately accepting pin 115 therein.

Side view of adjustable locator 90 depicted in FIG. 6C shows one of a pair of opposing reinforcing plates 112. Plates 112 increase the overall strength and rigidity of adjustable locator 90 when using, moving, and storing adjustable locator 90.

A top isolated view of rotatable base 93 is shown in FIG. 6E. Rotatable base 93 includes a recessed inner region 122 and an outer region 124. Recessed inner region 122 includes slots 95 which allow bolts to be threaded into base table 20 to cinch rotatable base 93 thereto. By providing base 93 with recessed inner region 122 of a sufficient depth, bolt heads will clear the back of base 92 when adjustable locator 90 is in use. Threaded bolt holes 97 accept bolts 96 which cinch rotatable base 93 against base 92.

A top isolated view of rotatable base 92 is depicted in FIG. 6F. Center hole 114 is sized and configured to accommodate a press fitted pin therein and various holes 116 are located to match selected holes located in flanges to be positioned there against. Holes 116 may be threaded or sized to accept pins or other means of locating and retaining, or fastening, the relevant section of the workpiece to be positioned and retained by adjustable locator 90. Additional holes 116 may be added over time to match specific flange patterns, or other workpiece characteristics, that are to be positioned by the adjustable locator.

OPERATION OF THE INVENTION

After determining the desired layout for positioning and welding a particular workpiece or, manifold, of a specific design, the appropriate number and type of locators are selected. Horizontal locator 44 is installed on base table 20 in the appropriate location for accommodating a horizontally oriented flange such as shown in FIG. 3. Likewise a vertical locator 42, or an adjustable locator 90 is installed on base table 20 in the appropriate location for accommodating a vertically oriented flange such as shown in FIG. 3. Once a particular set up has been determined for a particular manifold, or workpiece, a set up drawing showing the location and positioning of the selected locators, including specific adjustments in the case of adjustable locators, for future reference by the welding operator may be made and kept on file. Representative manifold 40 having only two ends to be positioned and held by way of a single vertical locator and a single horizontal locator makes for a relatively simple setup. However, it can be appreciated that several of the disclosed end locators can be used with manifolds or workpieces, having a multitude of flanges having a variety of orientations and bolt hole patterns. For example, a manifold having 3 vertical flanges would be positioned by three end locators 42 predeterminely positioned and secured to base table 20 to accommodate each of the three flanges. Likewise, a manifold having a multitude of flanges, whether vertically oriented, horizontally oriented, or angled with respect to the base table, can be accommodated by a single or multiple disclosed end locators prepositioned on base table 20.

Thus it is apparent that the disclosed invention readily achieves the objects and advantages mentioned above, as well as others that are inherent therein. Although the disclosed invention has been discussed with respect to it being specifically suited for use in the positioning and welding of manifolds, it can be appreciated that the disclosed invention may be adapted for use, with or without modifications, for enabling non-manifold workpieces to be positioned and/or welded without departing from the spirit and scope of the appended claims.

What is claimed is:

1. A modular welding fixture apparatus for positioning a workpiece comprising:
   a) a base table having a base surface of a predetermined width and length having an array of openings through the surface of a predetermined size and configuration and the surface having an array of locator mounting holes co-located in a spaced relationship with respect to the openings and the holes extending essentially perpendicularly a predetermined distance into the work surface;
   b) at least one vertical end locator having a base plate that is removably mountable to the base table at preselected positions and at preselected angles with respect to a preselected datum, and the vertical end locator having a front plate jointed and extending at essentially a right angle from the base plate, the front plate having threaded mounting holes for accomodating threaded member means for locating the holding at least a portion of a workpiece, the base plate further having a plurality of slots extending radially outward from points proximate to a centrally located pin extending perpendicularly from the base plate; and
   c) at least one horizontal locator having a base plate that is removably mountable to the base table at preselected positions thereon, and the base plate having means for locating and holding at least a portion of a workpiece, the horizontal locator further having at least one pair of opposing slots extending radially outward from points proximate to a centrally located hole therein.

2. The modular welding fixture apparatus of claim 1 wherein the front plate of the vertical end locator has a plurality of holes located in predetermined positions to accommodate bolts or pin means therein for locating a workpiece against the front plate.

3. The modular welding fixture apparatus of claim 1 wherein the vertical end locator has a pair of oppositely positioned stiffener plates extending from the mounting base plate to the front plate on opposing sides of the vertical end locator.

4. The modular welding fixture apparatus of claim 1 wherein the horizontal end locator has a plurality of holes located in predetermined positions to accommodate bolts or pins therein to serve as means for locating a workpiece thereagainst.

5. A modular welding fixture apparatus for positioning a workpiece comprising:
   a) a base table having a base surface of a predetermined width and length having an array of openings through the surface of a predetermined size and configuration and the surface having an array of locator mounting holes co-located in a spaced relationship with respect to the openings, and the holes extending essentially perpendicularly a predetermined distance into the work surface;
   b) an adjustable vertical locator having a base plate joined to a vertically oriented front plate at an approximate right angle to each other, the adjustable vertical end locator further having a first rotatable base rotatably mounted to the base plate which is removably mountable to the base table at preselected positions and at preselected angles with respect to a preselected datum, the adjustable vertical locator further having a second rotatable base rotatively mounted to the front plate and having means for locating and holding at least a portion of a workpiece; and
   c) at least one horizontal locator means having a base plate that is removably mountable to the base table at preselected positions thereon, and the base plate having means for locating and holding at least a portion of a workpiece.

6. The modular welding fixture of claim 5 wherein a pair of reinforcing plates are attached on respective opposite sides of the front plate and the base plate of the vertical locator.

7. The modular welding fixture of claim 5 wherein the first rotatable base of the adjustable vertical locator has at least one slotted opening located at a predetermined position on the rotatable base and in which the at least one slotted opening is alignable with at least one corresponding slotted opening located at a predetermined position on the base plate.

8. The modular welding fixture of claim 5 wherein the first rotatable base of the adjustable vertical locator has a plurality of slotted openings extending radially outward from the proximate center of the rotatable base plate and terminating short of the periphery thereof, the slotted openings further being alignable with at least one of a plurality of corresponding slotted openings being located at predetermined positions on the base plate of the adjustable vertical locator.

9. The modular welding fixture of claim 5 wherein the front plate of the adjustable vertical locator has at least one slotted opening located at a predetermined position and in which the rotatable front plate has at least one hole at a predetermined location for accommodating at least one fastener means passing through at least one of the slotted openings and serving to cinch the rotatable front plate against the front plate at a preselected orientation.

10. The modular welding fixture of claim 5 wherein the front plate of the adjustable vertical locator has at least one pair of arcuate slotted openings located at a predetermined radius from a centrally located bushing and in which the rotatable front plate has at least one hole at a predetermined location for accommodating at least one fastener means passing through at least one of the arcuate slotted openings and serving to cinch the rotatable front plate against the front plate within a preselected range of rotation.

11. The modular welding fixture of claim 10 wherein the rotatable front plate has a plurality of holes therein for accommodating means for fastening a portion of a workpiece thereto.

12. The modular welding fixture of claim 5 wherein the vertical locator has a scale means and a pointer means for determining the relative position of the rotatable front plate with respect to the front plate.

13. The modular welding fixture of claim 5 wherein the vertical locator has a scale means and a pointer means for determining the relative position of the rotatable base plate with respect to the base plate.

* * * * *